United States Patent Office

3,703,549
PRODUCTION OF DICARBOXYLIC ACIDS
Bertram Yeomans, Hessle, England, assignor to
BP Chemicals Limited, London, England
No Drawing. Filed Sept. 8, 1970, Ser. No. 70,527
Claims priority, application Great Britain, Sept. 11, 1969,
44,850/69
Int. Cl. C07c 51/00, 51/14
U.S. Cl. 260—533 A            14 Claims

ABSTRACT OF THE DISCLOSURE

Di-neo acids are produced by treating a mono-neo acid containing at least 10 carbon atoms and no tertiary hydrogen atoms with strong acid.

---

The present invention relates to the production of di-neo acids.

In our copending application 835,778, filed June 23, 1969, now U.S. Pat. 3,609,185, it is disclosed that di-neo acids may be made by the reaction of certain olefins containing at least two isoalkyl groups i.e. having at least two tertiary hydrogen atoms, with formic acid in the presence of concentrated sulphuric acid or with carbon monoxide in the presence of a mineral or Lewis acid.

Copending application 3,535, filed Jan. 16, 1970, discloses that di-neo carboxylic acids may be made by treating the anhydride of a mono-neo acid having at least one carbon atom bearing a tertiary hydrogen separated from the neo-carboxylic acid group by at least two carbon atoms, with strong acid. Copending application 856,204, filed Sept. 8, 1969, discloses that a neo-carboxylic acid may be reacted with a compound containing one or more tertiary hydrogen atoms in the presence of a strong acid to produce a second neo-acid. The reaction of a mono-neo acid with another neo-acid containing tertiary hydrogen gives a di-neo acid.

The processes disclosed in the above mentioned applications have the general characteristic that the presence of a compound having a tertiary hydrogen is required and the only method of making di-neo acids from olefins mentioned in these applications requires an olefin having two tertiary hydrogen atoms.

Di-neo acids are useful for many applications. They may for example be reacted with alcohols to produce esters which may be used as heat transfer fluids or the basis for lubricants. Alternatively the di-neo acids may be used in the production of plasticisers or polymers.

It would be desirable to be able to make di-neo carboxylic acids from a starting material which did not contain tertiary hydrogen atoms and which starting material could be made from an olefin also having no tertiary hydrogen atoms as this would make possible the use of a wider range of feedstocks.

According to the present invention the process for the production of a di-neo acid comprises treating a mono-neo acid containing 10 to 21 carbon atoms of formula:

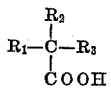

where $R_1$, $R_2$ and $R_3$ are all alkyl groups which may be the same or different and which do not contain tertiary hydrogen and which each contain from 1 to 7 carbon atoms, with strong acid.

By "tertiary hydrogen atom" is meant throughout this specification a hydrogen attached to a carbon atom whose other valencies are satisfied by carbon atoms. It will be understood that for an alkyl group to contain no tertiary hydrogen it may be a straight chain alkyl group or any branching must be gem branching i.e. two branches on the same carbon atom.

By "neo-acid" is meant throughout this specification a carboxylic acid in which the carboxyl group is linked to a carbon atom whose remaining valencies are all linked to carbon atoms.

The mono-neo acid used in the re-arrangement reaction is preferably derived from an olefin by reaction with formic acid or carbon monoxide in the presence of strong acid. The olefin may be an acyclic one containing 9 to 20 carbon atoms with one alkyl substituent only in the chain and having a structure such that when fully hydrogenated it gives a paraffin of formula:

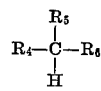

where $R_4$, $R_5$ and $R_6$ are all alkyl groups which may be the same or different and may each contain 1 to 7 carbon atoms.

It will be understood that the requirement that the olefin should have only one branch means that the alkyl groups $R_4$, $R_5$ and $R_6$ all contain no tertiary hydrogen atoms. The alkyl substituent may thus contain one or more carbon atoms e.g. 1 to 3 and may be sited at any carbon atom in the chain, but preferably at the 2 or 3 position in the chain. The double bond may be anywhere in the molecule, but it is preferably at an internal position, most preferably at the center of the molecule. Examples of suitable olefins are 2-methyloctene-4 and 2-methylnonene-4, or 4-methyl-undecane-4.

The formation of the di-neo acid from the mono-neo acid proceeds by way of a rearrangement which gives a di-neo acid and a paraffin or a mixture of paraffins. The formation of the mono-acid from an olefin, like the rearrangement reaction, requires a strong acid and where the mono-neo acid is prepared by the reaction of an olefin with carbon monoxide in the presence of strong acid the rearrangement to give di-neo acid may be combined with the production of the mono-neo acid so that the di-neo acid is produced in a single reaction stage from the olefin. The rearrangement of the mono-neo acid to the di-neo acid is supressed by formic acid so that if the mono-neo acid is prepared by a reaction which involves formic acid, the formic acid must be removed before the rearrangement can take place.

The strong acid may be a Bronsted acid, preferably with a pK value greater than 2, or a Lewis acid. The preferred acid to catalyze the re-arrangement reaction is concentrated sulphuric acid, which should be of at least 90% w./w., and preferably between 97% and 100% w./w. Other examples of suitable acids are phosphoric, perchloric, chlorosulphonic, fluorosulphonic and hydrofluoric acids. Nitric acid should not be used as it may give rise to oxidative side reactions. Boron trifluoride and its complexes with water and mineral acids and mixtures of pentafluoro-antimonate and hydrofluoric acid are examples of Lewis acids which may be used.

It is preferred to have a molar ratio of strong acid present to mono-neo acid of at least 1:1. It is particularly preferred to have a molar ratio of strong acid to mono-neo acid of 5:1 to 20:1.

The reaction may be carried out at ambient temperature. The preferred range is 0° to 60° C., particularly 5° to 30° C.

The strong acid used in the production of the mono-neo acid from the olefin is suitably the same as that used for the re-arrangement reaction, and the reaction may be carried out at the same temperature. It is preferred to add the olefin to the acid in a solvent, such as tetrachloroethylene, carbon tetrachloride or a paraffin. It is preferred to use at least one molecule of strong acid and at least one molecule of formic acid per molecule of olefin. The particularly preferred conditions are 1 to 10 moles of sulphuric acid and 1 to 3 moles of formic acid per mole of olefin.

The di-neo acid produced will have 1 carbon atom more than the mono-neo acid from which it is produced. Examples of di-neo acids which may be produced by the process of the present invention are 2,2,6,6-tetramethyl pimelic acid (2,2,6,6-tetramethyl heptandioic acid); 2,2,7,7-tetramethyl suberic acid (2,2,7,7-tetramethyl octandioic acid) and 2,2,9,9-tetramethyl sebacic acid (2,2,9,9-tetramethyl decandioic acid). Thus di-neo acids in which the carboxylic acid groups are at the end of the chain may be produced.

The invention is further illustrated in the following examples.

EXAMPLE 1

Production of mono-neo acid

Formic acid (1.5 mol. of 99% w./w.) and 2-methyloctene-4 (1 mol) dissolved in tetrachloroethylene (1 mol) were added under stirring to a round bottom flask (1 l.) which contained sulphuric acid (6 mol of 99% w./w.) so that a slight excess of formic acid to olefin was always present in the reactor. The additions were carried out over 2 h. at $+2°$ to $+15°$ C. The reaction product was then diluted with water. The neo-acid (0.880 mol) produced was chemically separated from neutral reaction by-products by forming the sodium salts and selectively dissolving in water. The neo-acid was shown to mainly consist of 2,2-dimethyloctanoic acid (g.-l./c., infra-red, N.M.R. and mass spectroscopic analysis).

Production of di-neo acid 2,2-dimethyloctanoic acid (0.20 mol) was mixed with 99% w./w. sulphuric acid (0.40 mol) at 22° C. and was then allowed to stand for 11 days. The mixture was poured into two volumes of water and the precipitated 2,2,6,6-tetramethylpimelic acid (0.00144 mol) was separated by filtration. Neutral by-products (0.42 g.) were isolated by chemical separation and these largely consisted of 2-methyloctane (39.1% w./w.), 3-methyloctane (28.2% w./w.) and 4-methyloctane (16.5% w./w.).

EXAMPLE 2

Production of mono-neo acid

Formic acid (1.5 mol of 99% w./w.) and 2-methylnonene-4 (1 mol) dissolved in tetrachloroethylene (1 mol) were added under stirring to a round bottom flask (1 l.) which contained sulphuric acid (6 mol of 99% w./w.) so that a slight excess of formic acid to olefin was always present in the reactor. The additions were carried out over 2 h. at $+1°$ to 13° C. The reaction product was then diluted with water. The neo-acid product (0.896 mol) was chemically separated from neutral reaction by-products. The neo-acid product mainly consisted of 2,2-dimethylnonanoic acid.

Production of di-neo acid 2,2-dimethylnonanoic acid (0.010 mol) was mixed with 99% w./w. sulphuric acid (0.200 ml.) at 23° and was then allowed to stand at ambient temperatures for 8 days. The mixture was poured into two volumes of water and the precipitated 2,2,7,7-tetramethylsuberic acid (0.00135 mol) was separated by filtration. Neutral by-products (0.425 g.) largely consisted of 2-methylnonane (38.9% w./w., 3-methylnonane, (24.8% w./w.), 4-methylnonane (17.2% w./w.) and 5-methylnonane (7.9% w./w.).

EXAMPLE 3

Production of mono-neo acid

Formic acid (0.5 mol of 99% w./w.) and 4-methyl-undecene-4 (0.33 mol) dissolved in tetrachloroethylene (0.33 mol) were added under stirring to a round bottom flask (500 ml.) which contained sulphuric acid (2 mol of 99% w./w.) so that a slight excess of formic acid to olefin was always present in the reactor. The additions were carried out over 2 hrs. at 0° to $+12°$ C. The reaction product was then diluted with water. The neo-acid (0.151 mol) produced was chemically separated from neutral reaction products by forming the sodium salt and selectively dissolving in water. The neo-acid was shown to mainly consist of 2-methyl-2-propylnonanoic acid (g.=l./c. N.M.R., infra-red and mass spectroscopic analysis).

Production of di-neo acid 2-methyl-2-propylnonanoic acid (0.01 mol) was mixed with 99% w./w. sulphuric acid (0.2 mol) at ca. 20° C. and was then allowed to stand for 4 days. Separated hydrocarbon (0.4202 g.) was then removed and the remainder was poured into two volumes of water. The carboxylic acid phase (1.542 g.) which was separated, contained 2,2,9,9-tetramethylsebacic acid (0.0022 mol) and this amounted to a molar yield of 44% of theory.

I claim:

1. A process for the production of a di-neo acid, which comprises rearranging a mono-neo acid containing 10 to 21 carbon atoms of formula:

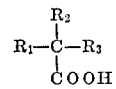

wherein $R_1$, $R_2$ and $R_3$ are all alkyl groups, which may be the same or different, having from 1 to 7 carbon atoms and containing no tertiary hydrogen atoms, while in contact with a strong acid selected from the group consisting of sulfuric acid, phosphoric acid, chlorosulphonic acid, fluorosulphonic acid, hydrofluoric acid, boron trifluoride, complexes of boron trifluoride with water and mineral acids and mixtures of pentafluoro-antimonate and hydrofluoric acid at a temperature in the range of from 0° to 60° C.

2. A process according to claim 1 wherein the mono-neo acid is made by the reaction of carbon monoxide or formic acid with an acyclic olefin containing 9 to 20 carbon atoms with one alkyl substituent only in the chain and of such a structure that when fully hydrogenated it gives a paraffin of formula:

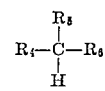

where $R_4$, $R_5$ and $R_6$ are all alkyl groups which may be the same or different and each contain 1 to 7 carbon atoms, in the presence of a strong acid selected from the group consisting of sulfuric acid, phosphoric acid, chlorosulphonic acid, fluorosulphonic acid, hydrofluoric acid, boron trifluoride, complexes of boron trifluoride with water and mineral acids and mixtures of pentafluoro-antimonate and hydrofluoric acid.

3. The process according to claim 2 wherein the olefin is reacted with carbon monoxide in the presence of said strong acid to give said di-neo acid in a single reaction stage.

4. A process according to claim 2 wherein the acyclic olefin is brought into contact with said strong acid at temperatures in the range 0° to 60° C.

5. The process according to claim 2 wherein the alkyl substituent contains 1 to 3 carbon atoms.

6. The process according to claim 4 wherein the alkyl substituent is in the 2 or 3 position in the chain.

7. The process according to claim 6 wherein the double bond in the olefin is in an internal position.

8. The process according to claim 7 wherein the olefin is 2-methyl octene-4 or 2-methyl nonene-4.

9. The process according to claim 7 wherein the olefin is 4-methyl-undecene-4.

10. A process according to claim 1 wherein the strong acid is concentrated sulphuric acid.

11. A process according to claim 10 wherein the sulphuric acid has a concentration of 97–100% wt./wt.

12. The process according to claim 11 wherein the molar ratio of strong acid to mono-neo acid is in the range 5:1 to 20:1.

13. A process according to claim 12 wherein the temperature is in the range 5 to 30° C.

14. A process according to claim 1 wherein the molar ratio of strong acid to mono-neo acid is at least 1:1.

References Cited

UNITED STATES PATENTS

| | | | |
|---|---|---|---|
| 3,099,687 | 7/1963 | Rohlffs | 260—533 A |
| 3,202,687 | 8/1965 | Vos et al. | 260—533 A |
| 3,210,404 | 10/1965 | Durr et al. | 260—537 R |
| 3,515,737 | 6/1970 | Yeomans | 260—533 A |

VIVIAN GARNER, Primary Examiner

U.S. Cl. X.R.

260—413, 537 R, 676 R